Sept. 11, 1934.  C. G. RICHARDSON  1,973,104
LOOP CUTTER
Filed Nov. 29, 1930  2 Sheets-Sheet 1

Inventor
C. G. Richardson
by
Geo. N. Goddard, Attorney

Sept. 11, 1934.                  C. G. RICHARDSON                  1,973,104
                                    LOOP CUTTER
                                 Filed Nov. 29, 1930              2 Sheets-Sheet 2
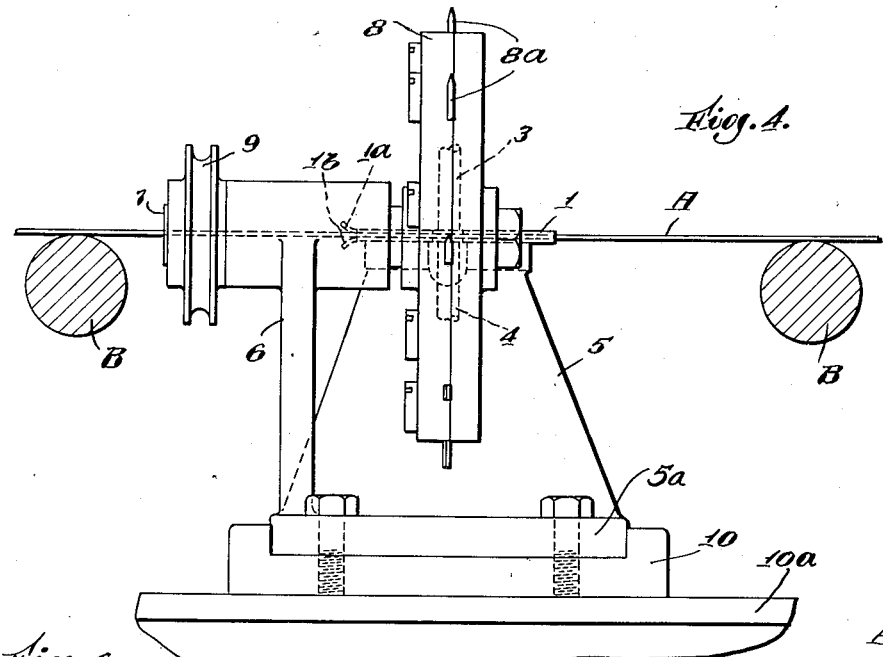
Fig. 4.
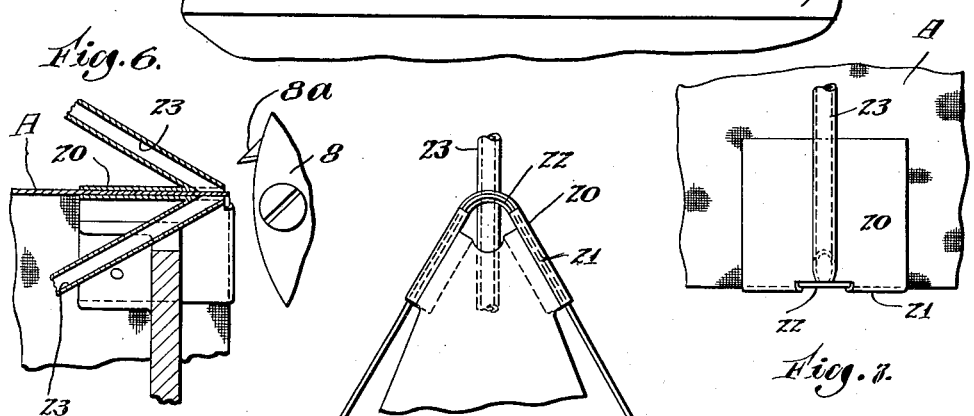
Fig. 6.                                                            Fig. 7.
Fig. 5.
Inventor
C. G. Richardson
by
Geo. N. Forkland, Attorney Patented Sept. 11, 1934

1,973,104

UNITED STATES PATENT OFFICE 1,973,104

LOOP CUTTER

Charles G. Richardson, Springfield, Vt., assignor to Parks & Woolson Machine Company, Springfield, Vt., a corporation of Vermont Application November 29, 1930, Serial No. 499,002

6 Claims. (Cl. 26—7)

This invention relates to the trimming or severing of the loops or float threads formed on the selvage or edge portion of cloth in the weaving operation.

In an earlier application filed by me the 30th day of January, 1930, Serial No. 424,556, now Patent No. 1,815,585, I have disclosed a device for the same purpose of cutting the float loops, in which the revoluble cutter is mounted to revolve across the edge of the cloth as it passed over the extreme end edge of a cloth rest, which was mounted to be automatically movable to follow the swerving of the edge of the cloth in and out. Unless, however, the travelling carriage, which supports the end section of the cloth rest and the cutter in proper relation to each other, is very quickly responsive to the movement of the cloth there is a possibility that an occasional loop may be missed by the cutter.

The present improvement is chiefly based on the principle of providing an edge guide for the cloth, that positively limits the outward movement of the cloth in relation to the revolving cutter which, in this case, is mounted entirely outside the edge of the cloth, the important requirement being that the cutter and the edge-limiting guide in this arrangement shall be located a fixed distance apart, so that the marginal portion of the cloth cannot possibly move into the path of the cutter which, if permitted, would result in cutting through the edge or selvage of the cloth, a thing which must be avoided. So long as this fixed relationship between the edge-limiting guide and the cutter is maintained it does not matter whether these parts are mounted on a fixed part of the frame of the machine or mounted on an automatically movable cloth controlled carriage, as in my former application. Ordinarily, however, the device may be used in connection with any usual or suitable means under the control of the operator for guiding the cloth up to this limiting edge and maintaining it there.

These and other features of the invention will be particularly described in the following specification and will be defined in the claims hereto annexed.

In the accompanying drawings I have shown a simple and convenient construction embodying the underlying principles of this invention, in which Fig. 1 is a plan view showing the edge-limiting guide and the revoluble cutter arranged in working relation to the marginal portion of the travelling cloth.

Fig. 4 is a side elevation showing a stretch of the travelling cloth passing through the edge-limiting guide just beyond the peripheral path of the revolving cutter blades.

Fig. 5 is a side elevation showing a modified form of edge-limiting guide in which the cloth is caused to travel through a salient angle at the point where the loop cutter operates.

Fig. 6 is a central vertical section of the form shown in Fig. 5 at right angles thereto, showing the relation of the peripheral portion of the cutter.

Fig. 7 is a plan view of the modified form of guide shown in cloth embracing position.

The present improvement is shown as an attachment that can be applied to any cloth shearing machine, or similar cloth treating machine, in which it is desired to sever the float loops formed at the edge of the cloth in weaving, so that when passed through the shearing or clipping elements the free ends of the float loop may be trimmed from the fabric.

Figure 1:
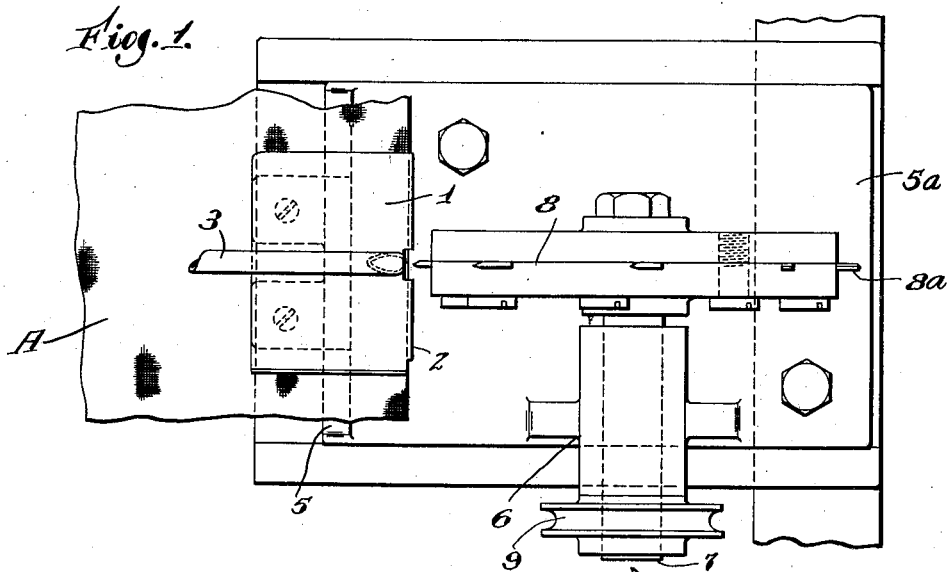
Figure 2:
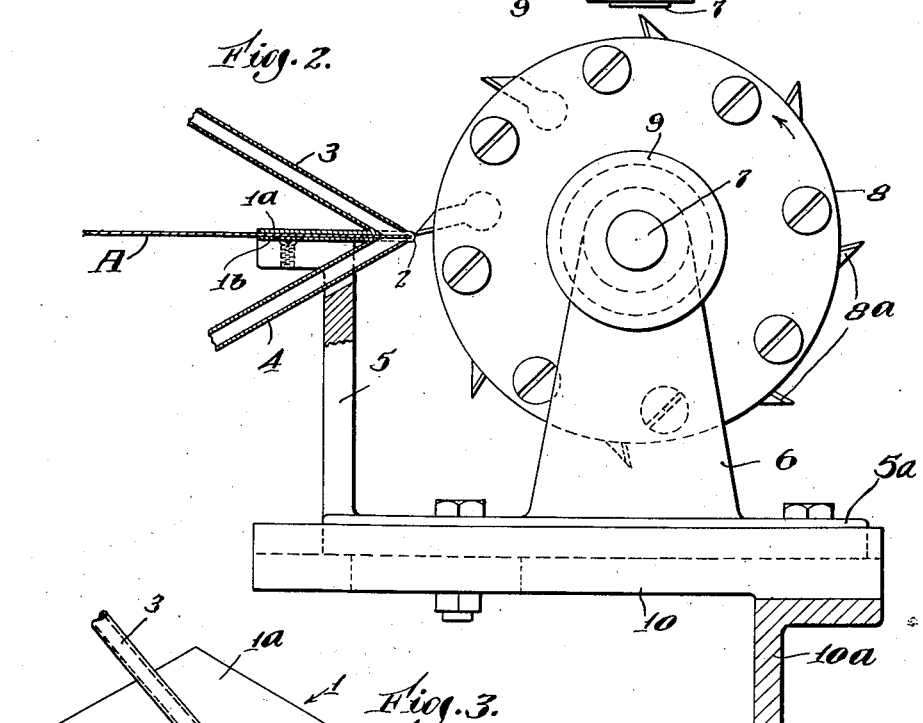
Fig. 2 is a front elevation with the guide shown in the sectional plane corresponding with the plane of the projecting cutter blades.
Figure 3:
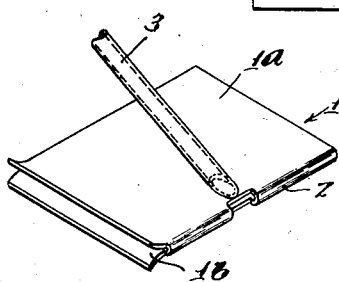
Fig. 3 is a detail showing in perspective the edge-limiting guide with its associated air blast tubes or nozzles.

In carrying out the principle of this invention in the form illustrated in Figs. 1 to 4, I provide a cloth embracing guide 1, which is formed to positively prevent or limit the outward movement of the travelling cloth beyond the guide. In the form shown, the guide embraces a plate of sheet metal, or other suitable material, that is doubled over upon itself along an intermediate line to form upper and lower cloth embracing plates 1ª and 1ᵇ in substantial parallelism with each other, but spaced apart sufficiently to allow the cloth to travel freely in a longitudinal direction through the guide. The outer edge portion of the guide is closed by the bent portion 2, which forms the edge-limiting part of the guide. Intermediate of its ends this guide 1 is recessed or notched at its folded edge and, adjacent to the notch, is provided an air blast pipe or nozzle 3 and a similar air blast pipe or nozzle 4 arranged to deliver blasts of air upon opposite portions of the marginal edge of the cloth and in opposition to each other so as to blow any selvage loops or float loops, that may lie on the face of the cloth, outwardly beyond the limiting edge portion of the guide. The tubes are inclined toward the guide in an outward direction to insure moving the loop threads outward through the recess in position to be engaged and severed by the cutter teeth.

The edge-limiting guide 1 is mounted on a suitable constructed standard 5, which includes a horizontal base member or slide 5a which may be adjustably clamped or bolted to a supporting bracket 10 secured to a fixed portion of the machine frame 10a. This slide 5a mounted in the fixed supporting frame is provided with a bearing stand 6, in which is mounted the rotary shaft 7, whose center is on a level with the edge of the cloth passing through the edge-limiting guide. On said shaft is mounted a rotary cutter comprising specifically in this case two discs 8 between which are clamped projecting cutter blades, whose forward edges are kept very sharp and travel through a peripheral path closely adjacent to the marginal edge of the cloth passing through the guide. By reference to Fig. 1 it will be seen that the cutting knives do not extend far enough into the notch, or recess, of the guide 1 to engage and cut the selvage itself, yet the cutting edges travel so close to the edge of the cloth, which is possible in view of the positive limit of movement of the cloth, that no float loops blown out through the recess can escape being severed by the rapidly revolving cutter blades. The cutter is rotated by any convenient means, in this case a belt pulley 9 secured to the opposite end of the cutter shaft 7 and driven from any suitable driver mounted on the machine to which the attachment is applied.

Fig. 4 illustrates clearly the line of travel of the cloth A between two spaced cloth supports of any suitable type through the edge-limiting guide 1 in opposition to the horizontal diameter of the cutter.

In cases where it is desired to use the guide on a machine where the cloth is given a salient angle of travel over a cloth rest of the type such as shown in my aforesaid earlier application, the construction of the edge-limiting guide may be modified by bending the sheet 20 to conform to the salient angle of the travel of the cloth between the two cloth supports C, the intermediate portion of the cloth limiting edge member 21 of the plate being notched or recessed, as shown at 22, to expose the float loops to the action of the cutter 8 as indicated in Fig. 6. In this case, the underneath and the upper portions of the plate 20 are provided respectively with similar air blast nozzles or pipes 23 inclined to deliver the opposing air blast outwardly against the edge of the cloth and blow the loops out through the recess 22 in position to be caught and severed by the cutter blade 8.

What I claim is:

1. In a device of the class described, the combination with an edge-limiting guide for positively limiting the outward movement of the cloth, and a rotary cutter revolving about an axis in substantial parallelism with the longitudinal travel of the cloth at the point of severance, the axis being also substantially on a level with that portion of the travelling cloth that is opposite the cutter.

2. In a device of the class described, the combination with a cloth embracing guide arranged to permit lengthwise travel of the edge portion of the cloth through it, and having means to positively limit outward movement of the edge of the cloth passing through, said guide being provided with an opening for exposing loop threads to the action of the cutter, and a rotary cutter mounted outside the cloth to rotate in a plane transversely of the cloth that intersects the cloth and said opening.

3. In a device of the class described, the combination of a cloth guide comprising substantially parallel cloth embracing members and a connecting outer edge portion arranged to limit the outward movement of the cloth, said edge portion being provided with an opening for exposing float loops beyond the edge of the cloth, means for directing the float loops through said opening, and a rotary cutter arranged outside the cloth to revolve across the line of said opening and sever the float loops there presented to it.

4. A loop cutter embracing in combination, an edge-limiting cloth-embracing guide partly closed along its outer edge and provided with an opening for exposing loop threads, means for directing said loop threads through the opening, and a rotary cutter revolving transversely of the cloth in a plane intersecting said opening to sever the loop threads exposed thereto as the cloth travels through the guide.

5. In a loop cutter, the combination of an edge-limiting cloth embracing guide, a rotary loop cutter mounted on a guide-supporting slide with its axis in fixed relation to said guide wherever the guide is positioned, and means for directing the loop threads outwardly into the path of the cutter.

6. In a loop cutter, the combination of an edge-limiting, cloth embracing guide provided with one or more air blast passages for directing air blasts through the interior of the guide outwardly over the face of the cloth to eject selvage threads through a gap in the edge of the guide into the path of a rotary cutter, and a rotary cutter mounted with its axis in fixed relation to said guide and entirely outside said guide.

CHARLES G. RICHARDSON.